(12) United States Patent
Barrett et al.

(10) Patent No.: US 6,182,580 B1
(45) Date of Patent: Feb. 6, 2001

(54) MOBILE CONNECTABLE FURNITURE, A CONNECTOR THEREFOR AND METHOD OF CONNECTION

(75) Inventors: Shawn O. Barrett, Grayslake; Paul Bond, Chicago, both of IL (US); Michael A. Niver, Plymouth, WI (US)

(73) Assignee: Bretford Manufacturing, Inc., Franklin Park, IL (US)

( * ) Notice: Under 35 U.S.C. 154(b), the term of this patent shall be extended for 0 days.

(21) Appl. No.: 09/324,528

(22) Filed: Jun. 2, 1999

(51) Int. Cl.[7] .................................................. A47B 57/00
(52) U.S. Cl. ............................................... 108/64; 403/381
(58) Field of Search ................................. 108/64, 65, 69; 403/381; 74/457; 312/277, 111; 52/590.2, 592.1

(56) References Cited

U.S. PATENT DOCUMENTS

| 2,836,475 | 5/1958 | Sapp . |
|---|---|---|
| 4,639,049 | 1/1987 | Frascaroli et al. . |
| 4,884,513 | 12/1989 | Newhouse et al. . |
| 5,144,888 | 9/1992 | Heine et al. . |
| 5,337,657 | 8/1994 | Diffrient . |
| 5,570,971 | * 11/1996 | Rixen et al. ........................ 403/381 |

FOREIGN PATENT DOCUMENTS

348378 * 5/1931 (GB) ................................. 312/111

* cited by examiner

*Primary Examiner*—Janet M. Wilkens
(74) *Attorney, Agent, or Firm*—Wood, Phillips, VanSanten, Clark & Mortimer

(57) ABSTRACT

Tables and other mobile furniture used in seminars and training classes are joined by ring connector elements mounted for rotation on each item of furniture. Male and female dovetail connection points on the periphery of each ring are engaged to connect items of furniture.

26 Claims, 4 Drawing Sheets

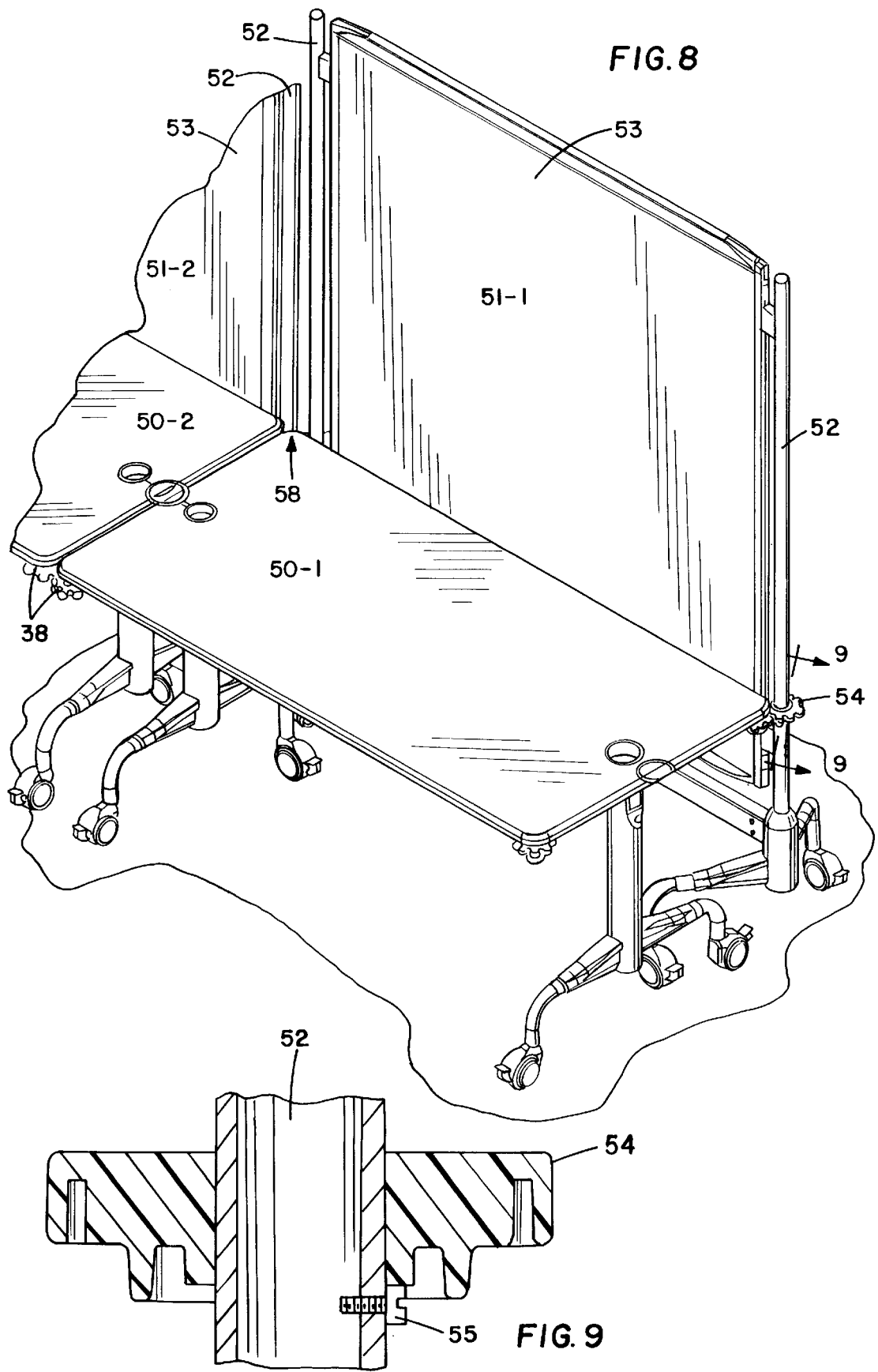

MOBILE CONNECTABLE FURNITURE, A CONNECTOR THEREFOR AND METHOD OF CONNECTION

BACKGROUND OF THE INVENTION

This invention relates to a connector for mobile furniture and to a method of connecting pieces of furniture.

Mobile furniture, as tables, audio/visual carts, divider panels and the like are widely used in seminars, workshops and training classes. The furniture is typically arranged in a particular configuration for one class or purpose and rearranged for the next. The connector disclosed herein interconnects the furniture in a desired configuration and accommodates many different furniture arrangements. The connector provides for easy and rapid connection and disconnection of furniture pieces.

It is known to interconnect modular furniture. However, the range of connected positions is limited and some connectors require tools and are semi-permanent in nature. Representative connectors are shown in:

Sapp, U.S. Pat. No. 2,836,475—Key 10, 12, 13, loaded by spring 11 is received in aperture 7 of bracket 6, FIGS. 1 and 2;

Heine et al. U.S. Pat. No. 5,144,888—Coupling member 5 engages bars 8;

Frascaroli et al. U.S. Pat. No. 4,639,049—Work surfaces are supported on interconnected beams 1;

Newhouse et al. U.S. Pat. No. 4,884,513—Brackets (not shown) between desk top 16 and top 300, FIG. 21, col. 17, lines 6–35; tables are joined by wedge-shaped linking elements 309, FIGS. 23–25; and Diffrient U.S. Pat. No. 5,337,657—Connector 120 engages latching strips 118, FIGS. 20–24.

BRIEF SUMMARY OF THE INVENTION

The connector comprises two connector elements, one for affixation to each of two pieces of furniture. One connector element has an arcuate surface with a plurality of laterally spaced connection points and the other connector element has a connection point to mate with a selected connection point of the one connector element. More particularly, the connection points form a dovetail joint with mating male and female dovetail configurations with the points having rounded edges for ease in engaging the connection points. Preferably, the connector elements are rings with alternate male and female connection points on the ring periphery and are rotatable about the ring axis. These features enable connection of two pieces of furniture with a selected and adjustable orientation.

Another feature of the connector is that one of the connector elements is affixed to a piece of furniture for vertical movement to engage the other connector element.

A further feature is that the connector elements are affixed to a piece of furniture substantially at the periphery thereof.

Still another feature of the connector element is a stop surface adjacent female connector points to position a complimentary male connection point for engagement with the female connection point.

Yet another feature is the method of connecting two pieces of furniture in which the connector elements are affixed to each piece of furniture and engaging a selected connection point of one connector element with a connection point of the other connection element. More particularly, each connector element is a ring rotatable in a horizontal plane about a vertical axis and having alternate mating male and female dovetail connection points on the periphery thereof. A male connection point of one connector element ring is engaged with a female connection point of the other connector element ring by vertical movement of one of the connector element rings.

BRIEF DESCRIPTION OF THE SEVERAL VIEWS OF THE DRAWINGS

FIG. 8 is a perspective of a table connected with a divider panel; and

FIG. 9 is a vertical section through a connector element affixed to a divider panel, taken along line 9—9 of FIG. 8.

DETAILED DESCRIPTION OF THE INVENTION

Furniture used in seminars and the like is lighter and more mobile than typical office furniture and is sometimes provided with wheels or glides to facilitate movement. The furniture is arranged for a particular seminar session and then may be rearranged for the next session or stored until needed again. The connector disclosed herein provides for interconnection of different items of furniture in a variety of configurations. The furniture items are quickly connected and disconnected without tools. The angular relationship of furniture items can be adjusted while the items are connected.

Figure 1:
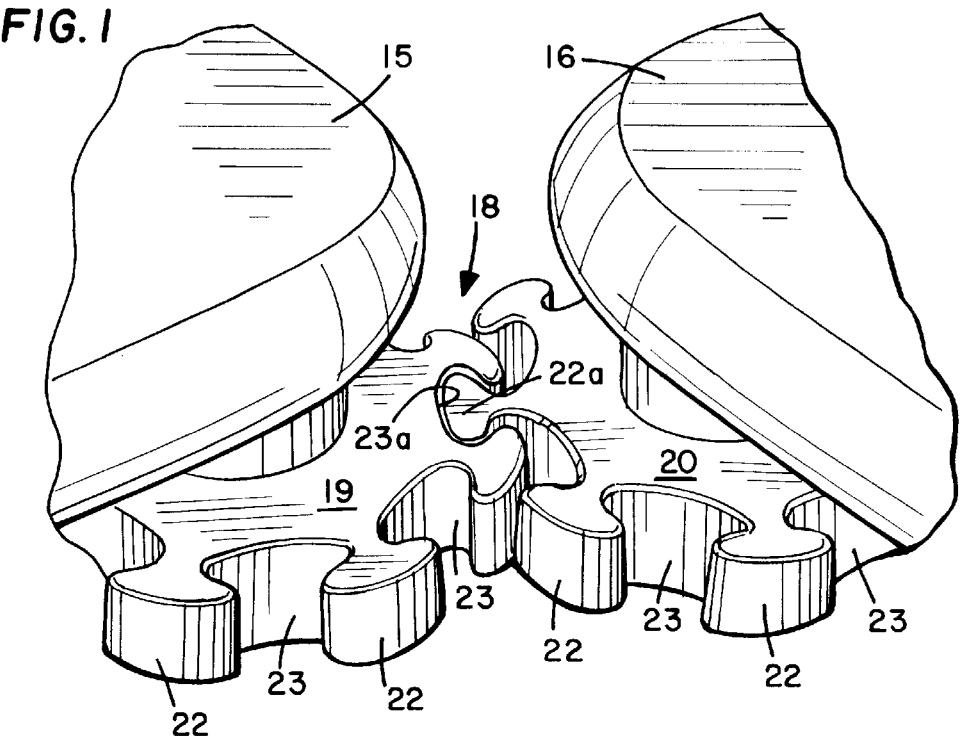
FIG. 1 is a perspective of the corners of two tables joined with a connector.
Figure 2:
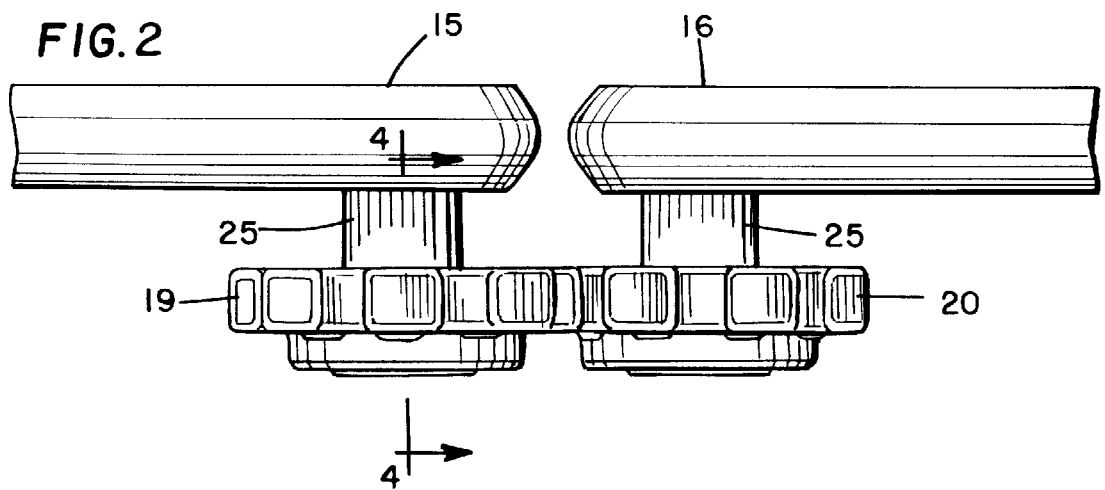
FIG. 2 is an elevation of the table corners and connector of FIG. 1.

The corners of two connected tables 15, 16 are shown in FIGS. 1 and 2. Connector 18 comprises connector elements 19, 20. Each connector element is a ring which has alternate, laterally spaced, dovetail-configured male and female connection points 22, 23, respectively, around the ring periphery. A male connection point 22a of ring 20 is received in a female connection point 23a of ring 19, connecting the corners 15, 16 of two together. Each ring has eight male and eight female connection points.

Connector rings 19, 20 are rotatably suspended below the undersides of the table surfaces by cylindrical mount 25. Cylindrical mount 25 is secured to the underside of the table by a screw 26 threaded to an insert 27 embedded in the table. Ring 19 has a bearing surface 29 which rests on a flange 30 at the lower end of cylindrical mount 25.

Figure 3:
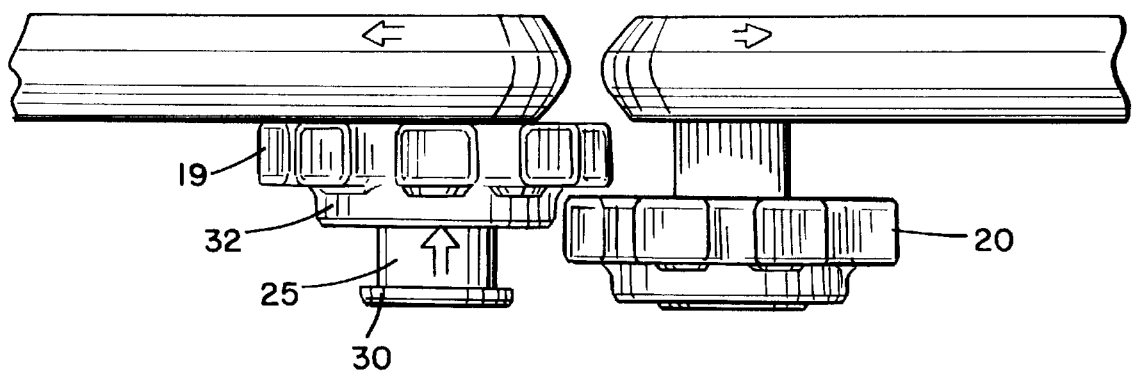
FIG. 3 is an elevation as in FIG. 2 with the connector elements separated.
Figure 4:
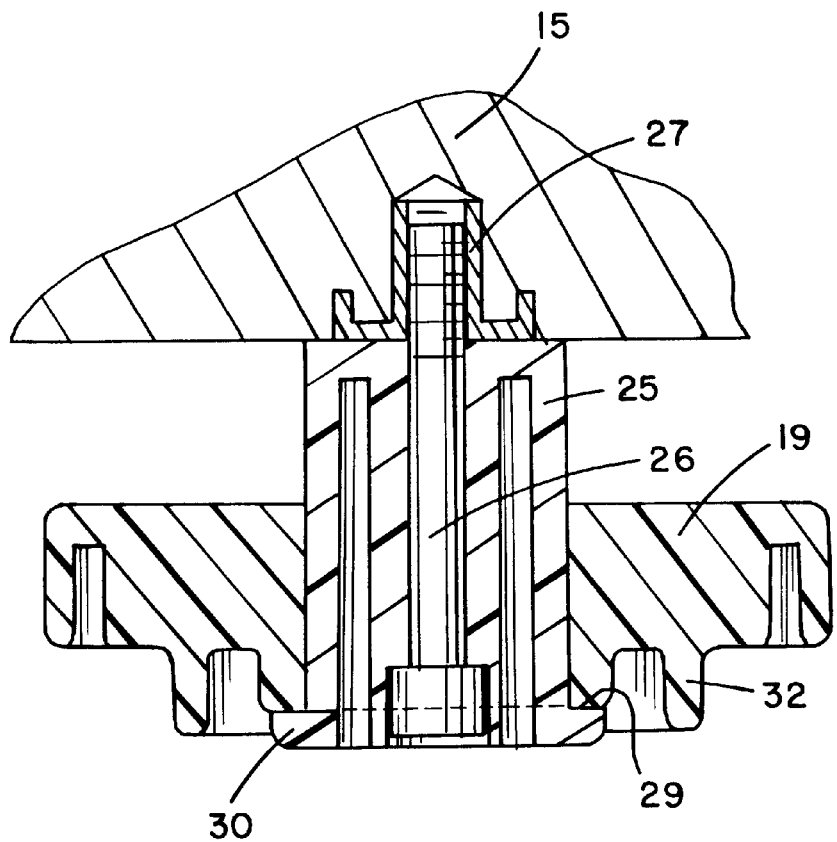
FIG. 4 is a vertical section through a connector element and a portion of the table taken along line 4—4 of FIG. 2.
Figure 5:
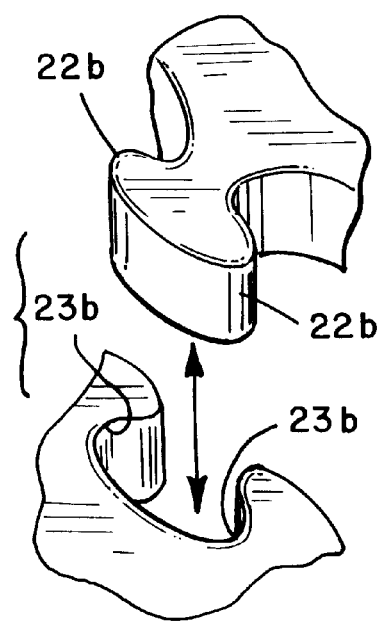
FIG. 5 is a fragmentary perspective of separated male and female dovetail connection points.

The length of cylindrical mount 25 is greater than the thickness of the connector points 22, 23 of rings 19, 20, so that one of the rings may be lifted above the other, as shown in FIG. 3, for engagement or disengagement of the connection points. A flange 32 depends from the lower surface of connector rings 19, 20, adjacent and inside female connection points 23. Flange 32 provides a stop surface to position a complimentary male connection point 22 adjacent and below the female connection point for ease of engagement of the male and female connection points. The edges of the male and female connection points are rounded so that they are guided into alignment upon engagement. In addition, the dimensions of the male connection point 22 are slightly smaller than those of the female connection point 23 so that they slip together easily. The female and male connection points are generally oval. The radii of the ends 22b of the male connection point are shorter than the radii of the ends 23b of the female connection point.

Rings 19 and 20 are preferably molded of a polycarbonate material. Mount 25 is preferably molded of Delrin. Both materials have a low coefficient of friction so that the connection points fit together readily and the rings rotate freely on the mounts.

Figure 6:
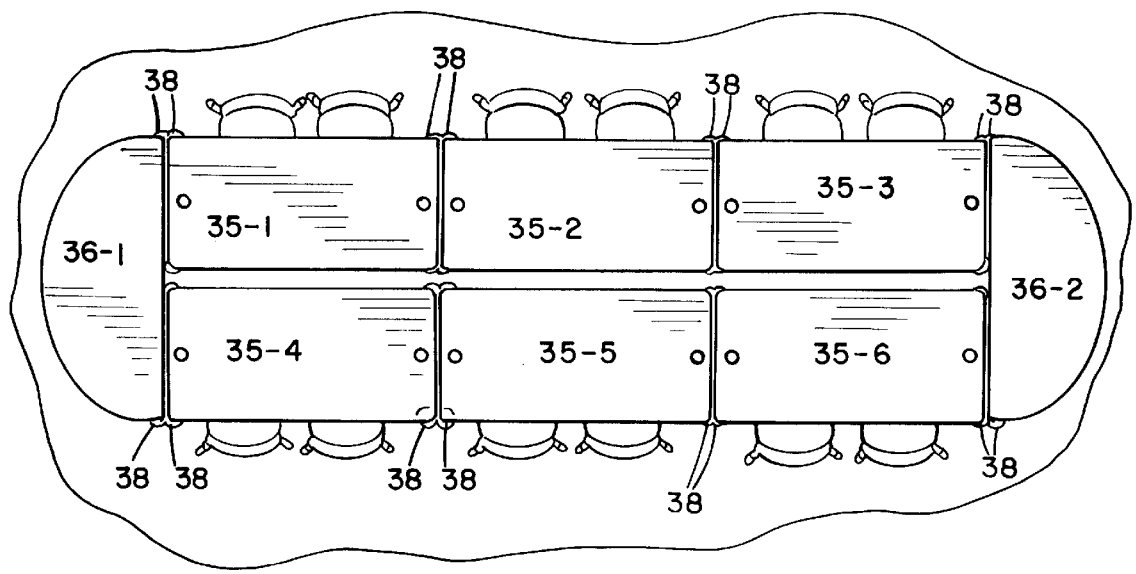
FIG. 6 is a plan view of one arrangement of connected tables.

A typical arrangement of connected tables is shown in FIG. 6. Six rectangular tables 35-1, -2, -3, -4, -5 and -6 are connected in two parallel sets of three tables joined lengthwise and flanked by two half round tables 36-1 and 36-2. Connector rings 38 are mounted at each corner of the rectangular tables and four connector rings are mounted along the diametric edge of each half round table. Not all rings are identified in the drawings. The rectangular tables are joined at both adjacent corners and the rectangular tables at the ends of each set are joined with the diametric edges of the adjacent half round tables at two points.

Figure 7:
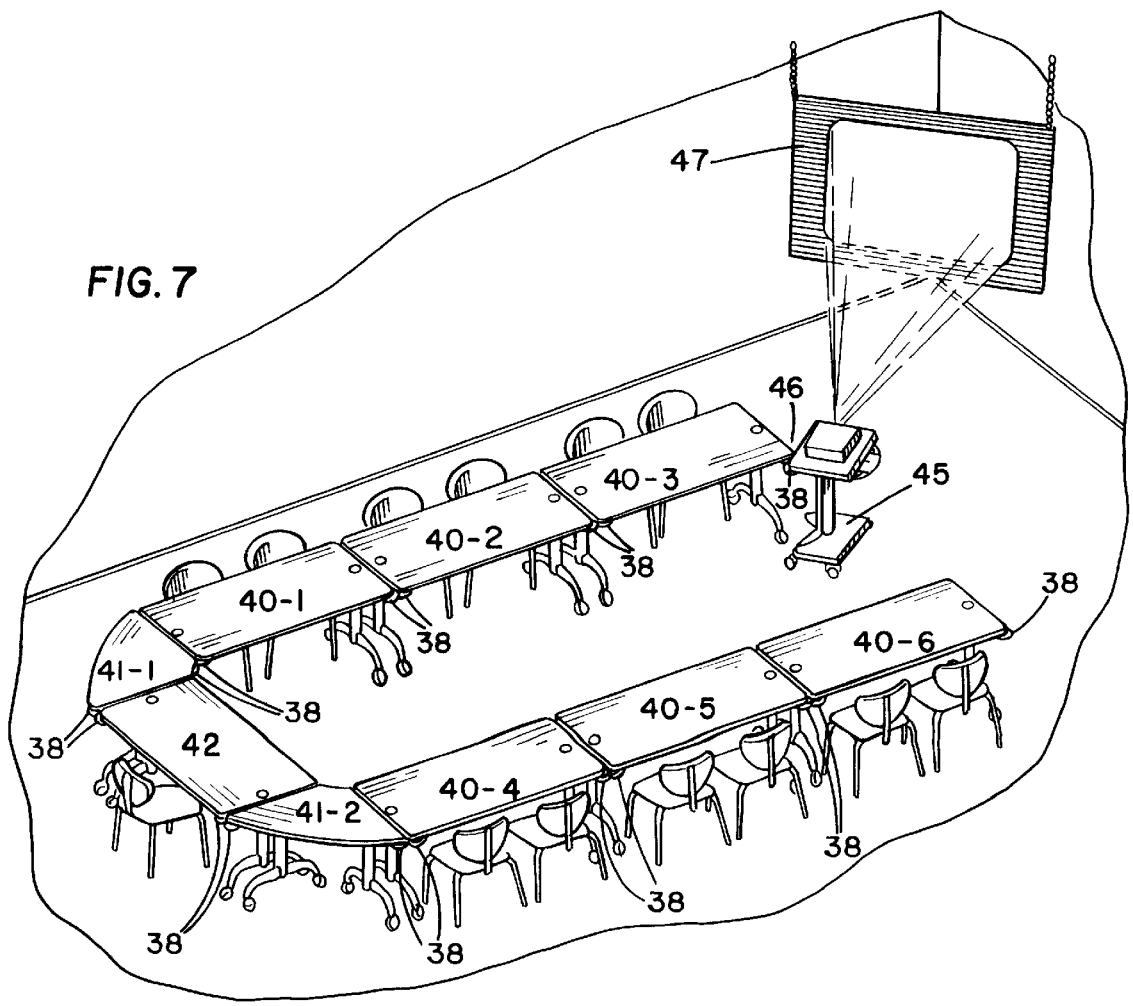
FIG. 7 is a perspective of another arrangement of connected tables and a projector stand.

Another furniture arrangement is illustrated in FIG. 7. A U-shaped table assembly is formed of two sets of three rectangular tables 40-1, -2, -3 and -4, -5, -6. The two sets of rectangular tables are joined at the base of the U by two quarter round table 41-1 and 41-2 at each end of rectangular base table 42. Connector rings 38 are mounted at each corner of the rectangular tables 40, 42 and the quarter round table 41. Each table is joined to the adjacent table or tables at two corners. A projector stand 45 is joined with table 40-3 by connector rings at 46 and may be adjusted in position with respect to the tables to center the projected image on screen 47.

Two rectangular tables 50-1 and 50-2 are joined together end-to-end and with mobile screens 51-1, 51-2 in FIG. 8. The tables are joined by connector rings 38 at each of the adjacent corners. Divider screens 51 each have tubular vertical frame members 52 on either side of panel 53 which may be a fabric or a board material, for example. Connector rings 54 (only one being visible in FIG. 8) are rotatably supported on vertical frame members 52 by a screw 55 threaded in tube 52, FIG. 9, at the same height as the connector rings 38 at the corners of the tables.

Screen 51-1 is positioned along the length of table 50-1 and connected with the table at both corners. The second table 50-2 and screen 51-2 are connected lengthwise with table 50-1 and screen 51-1, respectively. Each of the four rings 38 and 54 at the table screen junction 58 has two connections. The adjacent corners of tables 50-1, 50-2 are connected with each other and with the adjacent screen frame 52. The screen frames 52 are connected together and with the adjacent corners of tables 50-1 and 50-2.

What is claimed is:

1. A connector for joining two pieces of furniture, at least one of which is mobile, comprising:
    two connector elements, one adapted for affixation to each of the pieces of furniture,
    one connector element having an arcuate surface with a plurality of laterally spaced connection points, and
    the other connector element having a connection point to mate with a selected connection point of said plurality of laterally spaced connection points of said one connector element;
    at least one or the other connector element adapted for rotatable affixation to one of said pieces of furniture.

2. The connector of claim 1 in which the connection points form a dovetail joint with mating male and female dovetail configurations.

3. The connector of claim 2 in which said dovetail connection points have rounded edges.

4. The connector of claim 1 in which one of said connector elements is adapted for vertically slidable affixation to a piece of furniture, thereby allowing for vertical movement of the vertically slidably affixed connector element to engage the other connector element after affixation of both elements to their respective piece of furniture.

5. The connector of claim 1 in which said connector elements are rings with alternate male and female connection points on the ring periphery.

6. The connector of claim 5 in which the connector elements engage by axial movement of one of the rings with respect to the other.

7. The connector of claim 6 in which said male and female connection points have a dovetail configuration.

8. The connector of claim 7 in which the edges of the male and female dovetail connection points are rounded.

9. A connector for a piece of mobile furniture which has a horizontal planar surface with an underside, said connector comprising:
    the connector element ring of claim 5; and
    a cylindrical mount adapted to be secured to the underside of said furniture surface, inside the ring for rotation of the ring on the mount.

10. A piece of mobile connectable furniture having a periphery; and
    one of the connector elements of claim 1 affixed to said piece of furniture substantially at the periphery of the piece of furniture, to mate with the other connector element.

11. The piece of mobile connectable furniture of claim 10 wherein said one connector element is a ring with alternate male and female connection points on the ring periphery and affixed to the piece of furniture for rotation about the ring axis.

12. The piece of mobile connectable furniture of claim 11 wherein the piece of furniture is a table with plural corners having a rotatable ring connector at each corner.

13. The piece of mobile connectable furniture of claim 11 in which said furniture is an upright divider panel with vertical frame members and a ring connector rotatable on one of said vertical frame members.

14. A connector element for mobile furniture, comprising:
    a mount for securing the connector element to said mobile furniture, said mount defining an axis of motion; and
    a member slidably affixed to said mount for movement along said axis of motion with respect to said mount, said member having a surface with alternate male and female connection points.

15. The connector element of claim 14 in which said male and female connection points have dovetail configurations.

16. The connector element of claim 15 in which said dovetail connection points have rounded edges.

17. The connector element of claim 14 in which said member is annular and said surface is an outer peripheral surface thereof.

18. The connector element of claim 17 in which said member is a ring.

19. The connector element of claim 14 having a stop surface adjacent at least one of the female connection points to position a complimentary male connection point for engagement with the female connection point.

20. The method of connecting two pieces of furniture, at least one of which is mobile, comprising:
   affixing to each piece of furniture a connector element, one connector element having a surface with a plurality of laterally spaced connection points and the other connector element having a connection point to mate with one of said plurality of laterally spaced connection points of said one element; and
   engaging connection points of the connector elements to connect the two pieces of furniture by moving said one element relative to the piece of furniture to which said one element is attached, or by moving said other element relative to the piece of furniture to which said other element is attached.

21. The method of claim 20 in which each connector element is a ring rotatable in a horizontal plane about a vertical axis and having alternate mating male and female dovetail connection points on the periphery thereof, and further including the step of:
   engaging one said male dovetail connection point of one ring with one said female dovetail connection point of the other ring by vertical movement of one of the rings.

22. A piece of mobile connectable furniture comprising:
   a table having a periphery defining plural corners; and
   a connector affixed substantially at each corner, said connector including a ring shaped connector element affixed for rotation about the ring axis and having an arcuate surface with a plurality of laterally spaced male and female shaped connection points configured for mating respectively with a selected complementary female or male connection point of another such connector on another piece of mobile connectable furniture.

23. A piece of mobile connectable furniture comprising:
   an upright divider panel having a periphery and a vertical frame member substantially along the periphery; and
   a connector including a ring shaped connector element rotatably affixed to the vertical member for rotation about the vertical member and having an arcuate surface with a plurality of laterally spaced male and female shaped connection points configured for mating respectively with a selected complementary female or male connection point of another such connector on another piece of mobile connectable furniture.

24. A connector for mobile furniture which has a horizontal planar surface with an underside, said connector comprising:
   a ring shaped connector element having an arcuate surface with a plurality of laterally spaced male and female shaped connection points configured for mating respectively with a selected complementary female or male connection point on another such connector; and
   a cylindrical mount to be secured to the underside of said furniture surface, inside the ring for rotation of the ring on the mount.

25. The connector of claim 24 in which said cylindrical mount includes an end adapted for attachment of said mount to the underside of the furniture surface, and further includes a flange on which the ring rests, said flange spaced from the end of the mount adapted for attachment to the underside of the furniture surface.

26. The connector of claim 24 in which the ring has a thickness and the cylindrical mount is of sufficient length for vertical movement of the ring at least equal to the ring thickness.

* * * * *